No. 776,828. PATENTED DEC. 6, 1904.
J. EARNHART.
PRUNING IMPLEMENT.
APPLICATION FILED MAY 19, 1904.
NO MODEL.
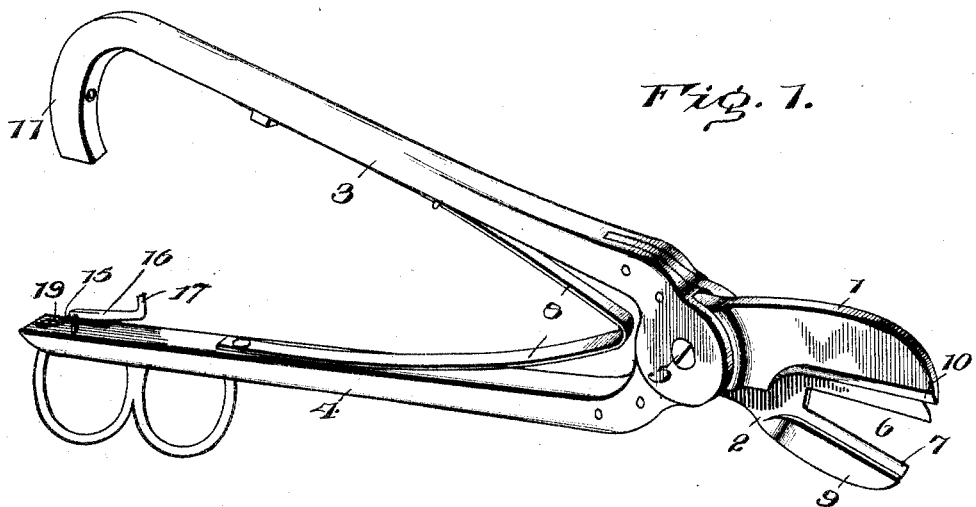
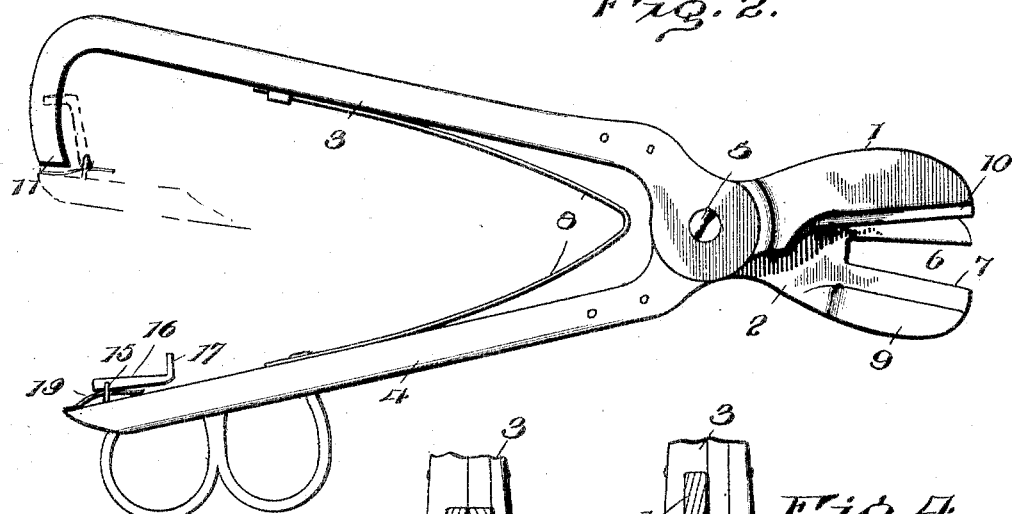
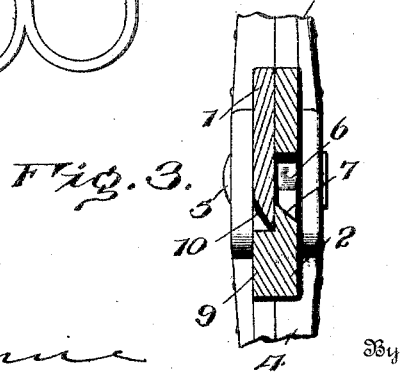
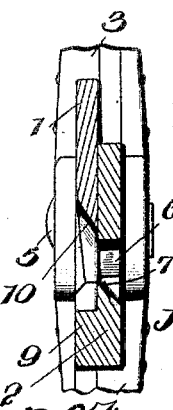
Witnesses
Inventor
J. Earnhart No. 776,828. Patented December 6, 1904.

UNITED STATES PATENT OFFICE.

JOHN EARNHART, OF SANTA PAULA, CALIFORNIA.

PRUNING IMPLEMENT.

SPECIFICATION forming part of Letters Patent No. 776,828, dated December 6, 1904.

Application filed May 19, 1904. Serial No. 208,764. (No model.)

*To all whom it may concern:*

Be it known that I, JOHN EARNHART, a citizen of the United States, residing at Santa Paula, in the county of Ventura and State of California, have invented certain new and useful Improvements in Pruning Implements, of which the following is a specification.

This invention relates to an improved form of pruning device especially adapted for use as shears for clipping fruit or the like.

In its preferred use my invention is particularly advantageous as a lemon-clipper, the implement being constructed so as to prevent cutting of the stem of the lemon or similar fruit too close to the body thereof. It is well known that in removing lemons and oranges from the tree if the stem which carries the fruit is cut close to the body of the lemon or orange the rind adjacent the severed portion will shrink, and the fruit is thus liable to lose its juice, so as to be unfit for shipment.

It is therefore the essential object of my invention to obviate the above disadvantages arising from the use of the ordinary clipping-shears.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of my invention. Fig. 2 is a side elevation. Fig. 3 is a vertical sectional view on the line X X of Fig. 2, the blades being shown closed. Fig. 4 is a vertical sectional view similar to Fig. 3, the blades being shown open.

Corresponding and like parts are referred to in the following description and indicated in all the views of the drawings by the same reference characters.

In general form my implement consists of pivoted blades 1 and 2, respectively. Handles 3 and 4 are separably formed with the respective blades 1 and 2, and these handles may be of any suitable length sufficient to enable the operator to obtain firm grasp upon the device. The blades 1 and 2 are pivoted at 5, and the pivotal connection may be of any substantial and desirable kind within the contemplation of my invention.

The blade 2 of my shears is of a peculiar form, being provided with an open slot 6, leading from the outer end thereof, the sides of said slot gradually converging in the direction of the pivot member 5. The slot 6 is located about centrally of the blade 2, and one of the sides of said slot is beveled so as to sharpen the same to afford a cutting edge 7. The side of the slot provided with the cutting edge 7 is remote from the cutting-blade 1 when the latter is in its normal open position under the influence of a spring 8, disposed between the handles 3 and 4 and coöperating with these handles in an obvious manner. Upon the blade 2 and projected from the side thereof adjacent which the blade 1 operates is a flange 9, which is of substantially the same length as the cutting edge 10 of the blade 1 aforesaid. The flange 9 is undercut so as to partially receive the cutting edge of the blade 1 in the operation of my implement and serves to assist in the shearing or cutting action of the blade 1 in its coöperation with the blade 2.

The closing movement of the blades 1 and 2 is limited by means of a lateral extension 11, projected from the handle 3, which extension is adapted to strike or engage the handle 4 as the blades are caused to move together by pressure upon the handles aforesaid. The extension 11 is curved somewhat, and besides serving in the capacity of a stop to limit the blades in closing said extension may be used as a hook or prong to engage a limb not in ordinary reach of the arm of the operator.

The implement is very simple in structure, and the blades have a shearing action in their coöperation, so as to afford a clean clear cutting of the stem of the fruit.

In using the implement the blade 2 is placed toward the body of the fruit, so as to prevent the edge of the blade 1 from coming into contact with the fruit, so that the shears cannot possibly injure the rind, and no liability of cutting the stem too short is incurred.

In order that the blades of the implement may be locked closed, the handle 4 is provided adjacent its outer end with a loop 15, projecting inwardly therefrom toward the handle 3. To the loop 15 is pivoted at a point between its ends a latch 16, provided with a nib 17, adapted to engage in a recess 18 upon the extension 11 of the handle 3. A spring 19 is secured to the inner side of the handle 4, being received between the sides of the loop 15, and this spring bears against the lower end of the latch 16, so as to hold the latch in engagement with the extension 11 or flat against the handle 4. The latch is designed to engage the extension 11 to hold the blades closed being disposed against the handle 4 when the implement is being used.

Having thus described the invention, what is claimed as new is—

In a pruning implement of the class described, the combination of pivoted cutting-blades, one of said blades being provided with an open slot leading from the outer end thereof inwardly toward the point of pivotal support, the sides of the slotted portion of the blade being converged toward the inner end of the slot, the side of the slot remote from the other cutting-blade being cut away to form a cutting edge, and a flange projected from the slotted cutting-blade upon the side thereof upon which the coöperating cutting-blade is disposed.

In testimony whereof I affix my signature in presence of two witnesses.

JOHN EARNHART. [L. S.]

Witnesses:
WM. ANDERSON,
L. D. NICKERSON.